(12) United States Patent
Rapitis et al.

(10) Patent No.: US 8,122,715 B2
(45) Date of Patent: Feb. 28, 2012

(54) SELF-CONTAINED REFRIGERANT POWERED SYSTEM

(76) Inventors: Marios K. Rapitis, Coram, NY (US); Markos Rapitis, Port Jefferson Station, NY (US)

(*) Notice: Subject to any disclaimer, the term of this patent is extended or adjusted under 35 U.S.C. 154(b) by 367 days.

(21) Appl. No.: 11/641,183

(22) Filed: Dec. 18, 2006

(65) Prior Publication Data
US 2007/0266709 A1 Nov. 22, 2007

Related U.S. Application Data

(63) Continuation-in-part of application No. 11/436,785, filed on May 18, 2006, now abandoned.

(51) Int. Cl.
*F01B 29/10* (2006.01)
(52) U.S. Cl. ............................. 60/513; 60/651; 60/671
(58) Field of Classification Search ............. 60/651, 60/671, 676, 513
See application file for complete search history.

(56) References Cited

U.S. PATENT DOCUMENTS

| 3,733,819 | A | * | 5/1973 | Mushines | 60/664 |
| 4,306,416 | A | | 12/1981 | Iozzi | |
| 4,340,030 | A | | 7/1982 | Molivadas | |
| 4,416,113 | A | * | 11/1983 | Portillo | 60/513 |
| 4,512,157 | A | | 4/1985 | Weadock | |
| 6,038,874 | A | * | 3/2000 | van der Walt et al. | 62/198 |
| 7,076,950 | B2 | * | 7/2006 | Klostermann | 60/513 |
| 7,082,774 | B2 | * | 8/2006 | Ayub | 62/84 |
| 7,260,934 | B1 | * | 8/2007 | Roberts | 60/651 |
| 2004/0020206 | A1 | * | 2/2004 | Sullivan et al. | 60/670 |
| 2005/0217288 | A1 | * | 10/2005 | Uno et al. | 62/157 |
| 2006/0112692 | A1 | * | 6/2006 | Sundel | 60/670 |
| 2007/0266708 | A1 | * | 11/2007 | Rapitis et al. | 60/651 |

* cited by examiner

*Primary Examiner* — Hoang Nguyen
(74) *Attorney, Agent, or Firm* — Carter, DeLuca, Farrell & Schmidt, LLP

(57) ABSTRACT

A self-contained refrigerant powered system is provided having a motor configured for receiving liquefied refrigerant and converting the liquefied refrigerant into gaseous form for powering the motor; a condenser in fluid communication with the motor for receiving gaseous refrigerant and for converting the gaseous refrigerant to liquefied form; and at least one pipe in fluid communication with the condenser and the motor for returning the liquefied refrigerant to the motor.

19 Claims, 3 Drawing Sheets

SELF-CONTAINED REFRIGERANT POWERED SYSTEM

SUMMARY

The present disclosure is directed to a self-contained refrigerant powered system for powering a motor using a refrigerant which is continuously converted from a liquid to a gas for use in powering the motor and back to a liquid. A plurality of boilers is provided in one embodiment for receiving the liquefied refrigerant and converting the liquefied refrigerant to a gas. After the gas is used to power the motor, the gaseous refrigerant is directed to a condenser of the self-contained refrigerant powered system where it is converted to a liquid prior to being redirected to at least one of the plurality of boilers.

A control mechanism having a plurality of sensors and a controller with at least one processor is provided for controlling the flow of the liquefied refrigerant to the plurality of boilers. The at least one processor receives boiler-related data from the plurality of sensors, where the data can include at least one of temperature, operational status (on or off), pressure and capacity data, and the at least one processor determines at least one boiler of which to direct the liquefied refrigerant to by appropriately controlling one or more valves. After processing the boiler-related data and determining at least one boiler to direct the liquefied refrigerant to, the controller generates and transmits signals to the one or more valves for opening and closing the same, and the liquefied refrigerant is directed to the at least one boiler.

In one alternate embodiment of the self-contained refrigerant powered system in accordance with the present disclosure, one boiler is provided instead of a plurality of boilers. Further, a return pump is provided between the condenser and the boiler for controlling the flow of liquefied refrigerant to the boiler.

In another alternate embodiment of the self-contained refrigerant powered system in accordance with the present disclosure, liquefied refrigerant is heated by a heating element and converted into gaseous form for use in powering the motor. Return pumps are provided for controlling the flow of the refrigerant through the system. A storage unit is provided for storing refrigerant for use in operation of the system.

Other features of the presently disclosed self-contained refrigerant powered system will become apparent from the following detailed description, taken in conjunction with the accompanying drawings, which illustrate, by way of example, the presently disclosed self-contained refrigerant powered system.

BRIEF DESCRIPTION OF THE DRAWINGS

The features of the presently disclosed self-contained refrigerant powered system will be described hereinbelow with reference to the figures, wherein.

DETAILED DESCRIPTION

Figure 1:
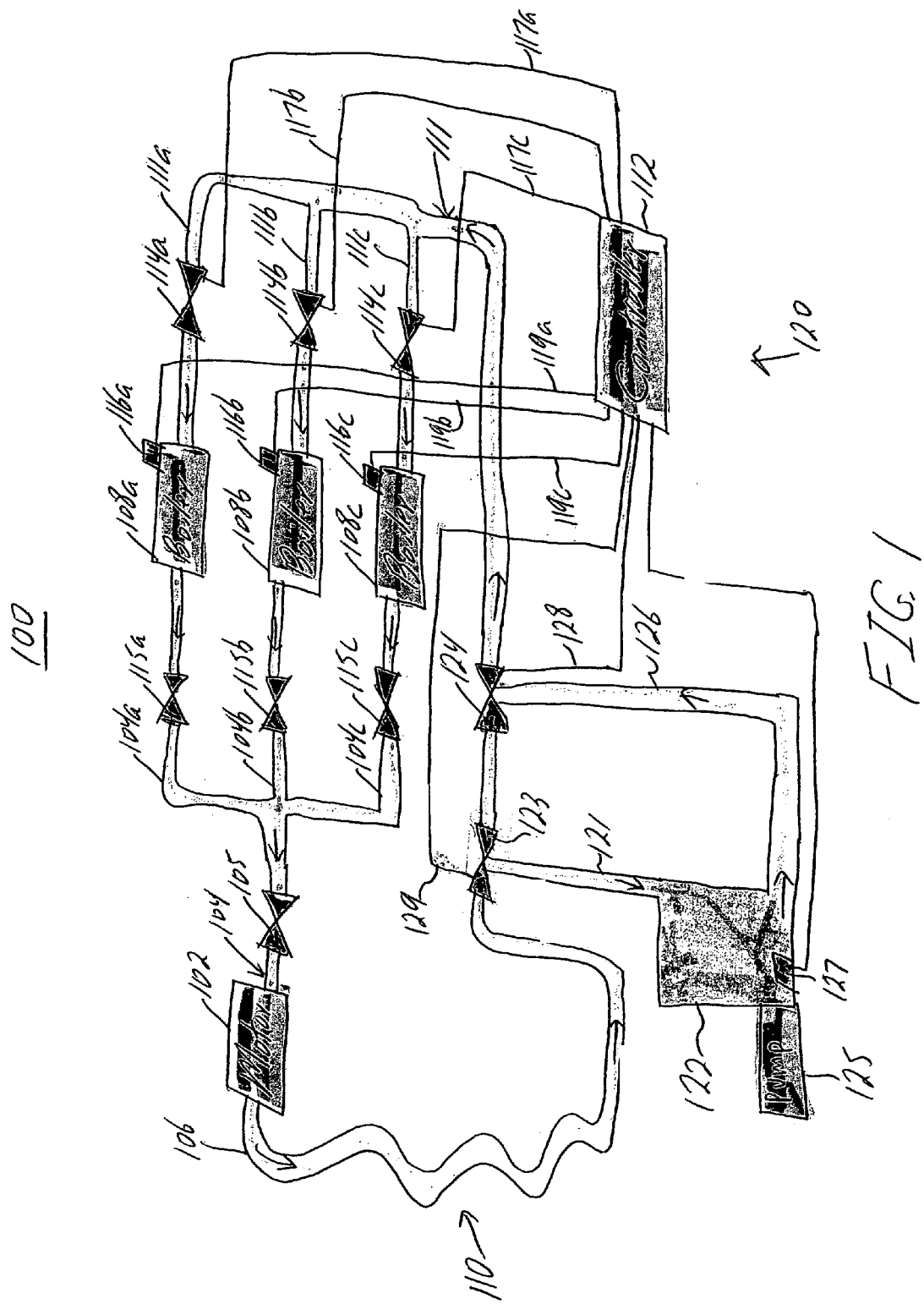
FIG. 1 is a block diagram of a self-contained refrigerant powered system according to an embodiment of the present disclosure.

Referring now to the drawing figures, wherein like references numerals identify identical or corresponding elements, various embodiments of the presently disclosed refrigerant powered system will now be described in detail.

The present disclosure describes three embodiments of a self-contained powered system. Self-contained as used herein describes the systems of the present disclosure as being able to power a motor with a predetermined amount of refrigerant for a plurality of operational cycles without requiring an operator to add additional refrigerant. An operational cycle is a cycle where the liquefied refrigerant is converted to gas using heat energy and then back to a liquid using a condenser. Optimally, the systems are designed such that they do not lose any refrigerant due to exhaust or waste and can be operated for a long period of time using the predetermined amount of refrigerant without the need to refuel or add additional refrigerant.

With initial reference to FIG. 1, a self-contained refrigerant powered system in accordance with the present disclosure is illustrated and described and is designated generally by reference numeral 100. During each operational cycle, the system 100 as described herein uses a refrigerant to power a motor, where the refrigerant is converted from a liquid to a gas for use in powering the motor and back to a liquid. Several refrigerants that can be used in system 100 include freon, butane, helium and nitrogen.

With continued reference to FIG. 1, self-contained refrigerant powered system 100 includes a motor 102 in fluid communication with a main outlet pipe 104 and an outlet pipe 106, and a plurality of boilers 108a-c each capable of heating a liquid refrigerant using a heating mechanism as known in the art. Each of the boilers 108a-c is in fluid communication with a respective inlet branch pipe 111a-c of a main inlet pipe or return pipe 111 and with a respective outlet branch pipe 104a-c of the main outlet pipe 104. Each inlet branch pipe 104a-c includes a check valve 115a-c for preventing backflow of the gaseous refrigerant to the boilers 108a-c. Additionally, each of the outlet branch pipes 111a-c includes a check valve 114a-c for preventing backflow of the liquefied refrigerant to main inlet pipe 111.

Each of the plurality of boilers 108a-c is adapted for heating under pressure the liquefied refrigerant received via one of the inlet branch pipes 111a-c and for converting the refrigerant from a liquid to a gas using heat energy. The gaseous refrigerant is outputted into outlet branch pipes 104a-c and directed towards check valve 105 positioned in main outlet pipe 104.

The gaseous and high temperature refrigerant is received via the main outlet pipe 104 by the motor 102 and is used for powering the motor 102 before being outputted to outlet pipe 106. Powering a motor using a gaseous refrigerant having a high temperature is well known in the art and is not described in detail herein. The motor 102 may be a turbine and/or internal combustion engine.

The gaseous refrigerant outputted to outlet pipe 106 is provided to a condenser 110 in fluid communication with the outlet pipe 106. Condenser 1 10 is a heat exchanger for condensing the gaseous and high temperature refrigerant and converting it from a gas to a liquid as known in the art. During the condensation process, the gaseous and high temperature refrigerant releases latent heat energy which can be harnessed for powering a cooling mechanism of condenser 110 or for other applications, such as powering a mechanism of a system in proximity to system 100. The cooling mechanism of condenser 110 may include, for example, a cooling fan (i.e. air cooled condenser), a water cooling mechanism, and other cooling mechanisms known in the art. The condensed and liquefied refrigerant flows from condenser 110 to main inlet pipe 111.

With continued reference to FIG. 1, a control mechanism 120 can be integrated with system 100 to the opening and closing of control valves 114a-c and thereby, control to which boiler or boilers 108a-c the liquefied refrigerant is provided to. It is contemplated that the control mechanism 120 can also be adapted and configured for controlling the opening and closing of the other valves of system 100, e.g., check valves 105 and 115a-c.

The control mechanism 120 includes a plurality of sensors 116a-c and a controller 112 having at least one processor in order to control the flow of the liquefied refrigerant to the plurality of boilers 108a-c. The at least one processor receives boiler-related data from the plurality of sensors 116a-c via wires 119a-c, where the data can include at least one of temperature, operational status (on or off), pressure and capacity data, and the at least one processor determines at least one boiler of which to direct the liquefied refrigerant to by appropriately controlling one or more of the check valves 114a-c. The plurality of sensors 116a-c are selected from the group consisting of temperature sensors, sensors capable of sensing the operational status of the boiler (on or off), pressure sensors and sensors capable of sensing the amount or volume of the refrigerant in the boiler.

After processing the boiler-related data and determining at least one boiler to direct the liquefied refrigerant to, the controller 112 generates and transmits signals to the one or more check valves 114a-c via wires 117a-c for opening and closing the same, and the liquefied refrigerant is directed to the at least one boiler. It is provided that if the at least one processor determines that none of the boilers 108a-c are capable of receiving the liquefied refrigerant, the at least one processor is programmed to shut down the motor 102 or the entire system 100.

Alternatively, the at least one processor can be programmed to direct the liquefied refrigerant to a storage unit 122 in fluid communication with the condenser 110 for temporarily storing the liquefied refrigerant to prevent the main inlet pipe 111 from being over-pressurized in the case where none of the boilers 108a-c are able to receive the liquefied refrigerant. As such, the controller 112 generates and transmits signal via wire 129 to a first check valve 123 positioned along main inlet pipe 111 to cause the valve 123 to open for directing the liquefied refrigerant to the storage unit 122 via storage inlet pipe 121. The controller 112 further generates and transmits a signal via wire 128 to a second check valve 124 also positioned along main inlet pipe 111 to cause the valve 124 to close for maintaining the liquefied refrigerant in the storage unit 122.

When the at least one processor determines that one or more boilers 108a-c is ready to receive the liquefied refrigerant, the controller 112 generates and transmits a signal via wire 129 to the first check valve 123 to cause the valve 123 to close for preventing any additional liquefied refrigerant from entering the storage unit 122. The controller 112 also generates and transmits a signal to the second check valve 124 via wire 128 to cause the valve 124 to open for enabling the stored, liquefied refrigerant to flow to the main inlet pipe 111 and to one or more of the boilers 108a-c. A pump 125 is operatively associated with the storage unit 122 for pumping the liquefied refrigerant out from the storage unit 122 and into the main inlet pipe 111 via storage outlet pipe 126. When the liquefied refrigerant has been pumped out of the storage unit 122 as relayed by sensor 127 to the controller 112, the controller generates and transmits a signal to the second check valve 124 via wire 128 to cause the valve 124 to close. During normal operation (i.e., when one or more boilers 108a-c are capable of receiving the liquefied refrigerant), the first and second check valves 123, 124 are both closed.

Figure 2:
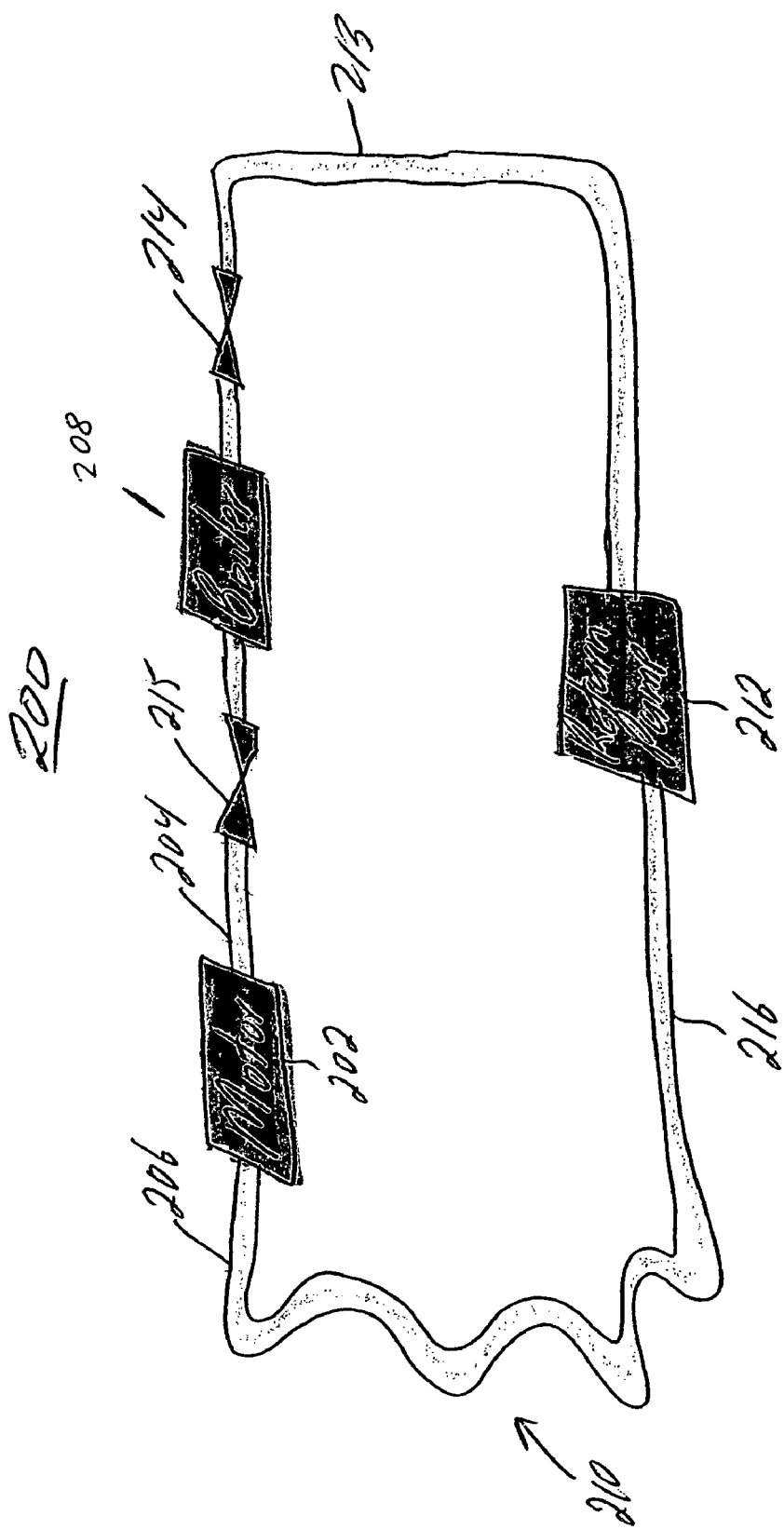
FIG. 2 is a block diagram of a self-contained refrigerant powered system according to one alternate embodiment of the present disclosure.

With reference to FIG. 2, a self-contained refrigerant powered system according to one alternate embodiment of the present disclosure is illustrated and described and is designated generally by reference numeral 200. The self-contained refrigerant powered system 200 of FIG. 2 is substantially similar to system 100 described hereinabove and thus will only be discussed in detail herein to the extent necessary to identify differences in construction and/or operation.

As illustrated in FIG. 2, self-contained refrigerant powered system 200 includes a motor 202 in fluid communication with a main outlet pipe 204 and an outlet pipe 206, and a boiler 208 having a heating mechanism as known in the art in fluid communication with the main outlet pipe 204 and a main inlet pipe 213. Boiler 208 is adapted for heating under pressure a liquid refrigerant for converting the refrigerant from a liquid to a gas. The gaseous and high temperature refrigerant is then provided to main outlet pipe 204 and directed to motor 202 for operating motor 202. A safety valve 214 is provided in main inlet pipe 213 for controlling the amount of liquefied refrigerant going to the boiler 208. A check valve 215 is positioned in main outlet pipe 204 for preventing backflow of the gaseous refrigerant to the boiler 208.

With continued reference to FIG. 2, motor 202 is adapted for receiving the gaseous and high temperature refrigerant from boiler 208 via main outlet pipe 204. After using the gaseous refrigerant to power the motor 202, the gaseous and high temperature refrigerant flows to outlet pipe 206 which is in fluid communication with a condenser 210.

Condenser 210 condenses the refrigerant and converts it from a gas to a liquid in the same manner as described above with reference to condenser 110. The liquefied refrigerant then flows to a return pump 212 via pipe 216. The return pump 212 pumps the liquefied refrigerant towards the boiler 208 via main inlet pipe 213.

One or more components of the systems 100, 200, such as the valves, the controller 112, the pump 125, the sensor 127, and the return pump 212, can be solar and/or wind powered. It is envisioned that the system 100 can be designed as a cascaded system.

Figure 3:
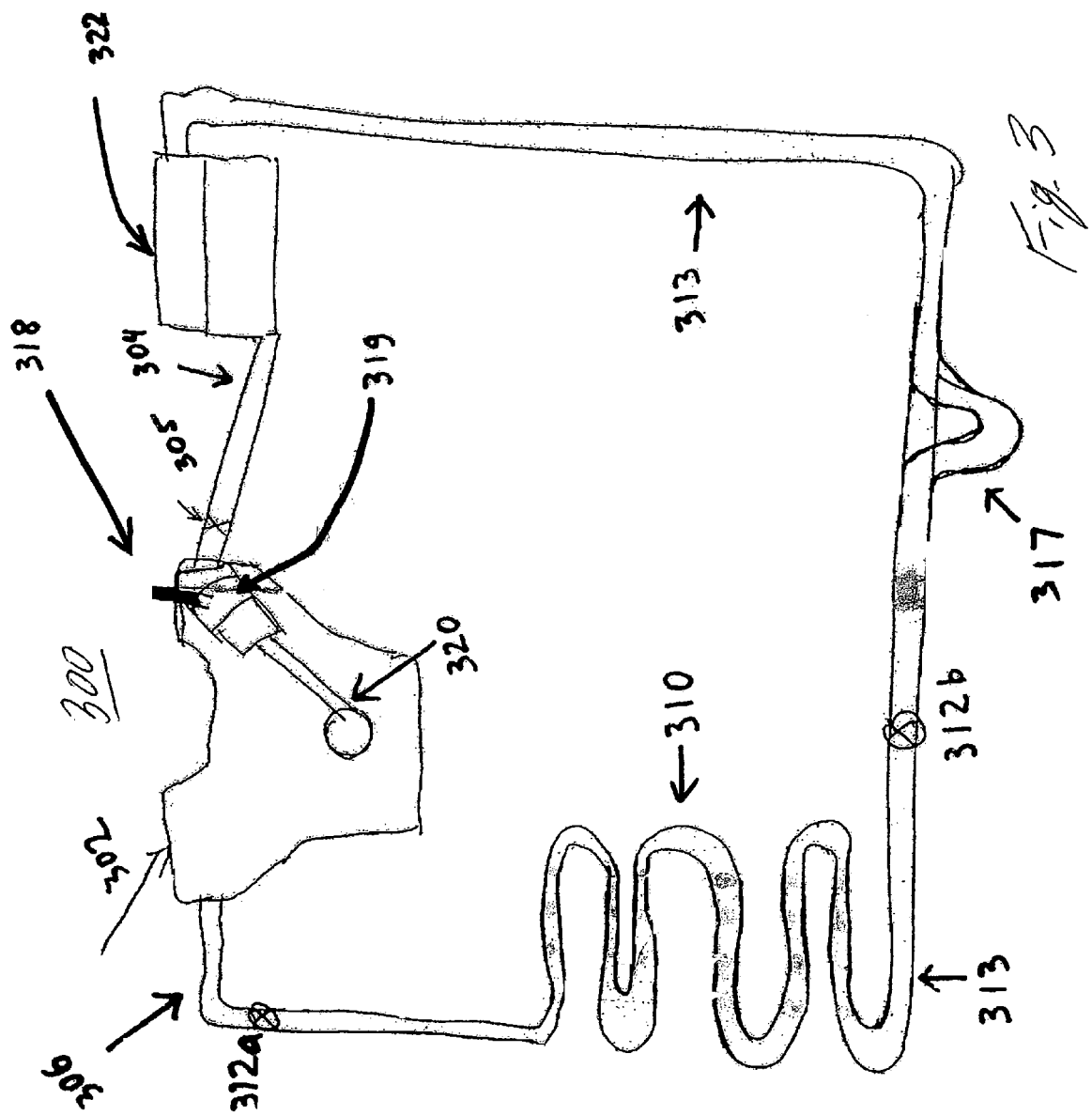
FIG. 3 is a block diagram of a self-contained refrigerant powered system according to another alternate embodiment of the present disclosure.

With reference to FIG. 3, a self-contained refrigerant powered system according to another alternate embodiment of the present disclosure is illustrated and designated generally by reference numeral 300.

As illustrated in FIG. 3, self-contained refrigerant powered system 300 includes a motor 302 in fluid communication with an outlet pipe 306 and an inlet pipe 304, a storage unit 322 in fluid communication with the inlet pipe 304 and a return pipe 313, a condenser 310 in fluid communication with the outlet pipe 306 and the return pipe 313, and return pumps 312a-b in fluid communication with the motor 302, the condenser 310 and the storage unit 322 via at least one of the inlet pipe 304, outlet pipe 306 and return pipe 313. Return pumps 312a-b together with the condenser 310 and the storage unit 322 assist in alleviating pressure problems and backflow of the refrigerant that may arise during the operation of the system 300. Several refrigerants that can be used in system 300 include freon, butane, helium and nitrogen.

In operation, liquefied refrigerant is stored within the storage unit 322 from where it flows via the inlet pipe 304 and a metering device 305 to the motor 302. The motor 302 is adapted for receiving the liquefied refrigerant from the inlet pipe 304.

The metering device 305, such as Schoonover MC & MCR Series Laminar Mass Flow Controller, is positioned in proximity to inlet pipe 304 for measuring at least one of mass flow of the refrigerant, pressure of the refrigerant, temperature of the refrigerant, and volumetric flow of the refrigerant. The metering device 305 can be attached to a notification and correction system for monitoring system 300 for any errors or irregularities that inhibit the proper flow of the refrigerant, such as a low volumetric flow of the refrigerant due to a pipe leak or low high pressure of the refrigerant due to a pipe leak. The notification and correction system is able to automatically correct the error or the irregularity, such as increasing the amount of the refrigerant in the system 300 in case of a pipe leak or shutting off the system 300 due to high pressure. The notification and correction system gets the refrigerant data from a network of sensors placed in various locations in proximity to system 300.

Inside the motor 302, the liquefied refrigerant enters a chamber 319 where it is heated by a heating element 318, such as a sparkplug, a transformer or an electrode. The heating element 318 causes the liquefied refrigerant to convert to a gaseous form. The gaseous refrigerant expands and moves the piston 320 for operating the motor 302. The motor 302 can be modified diesel, gas, steam, turbine motor, or any other kind of internal or external combustion motor as known in the art.

After the gaseous refrigerant powers the motor 302, the gaseous refrigerant flows to the outlet pipe 306, which is in fluid communication with the condenser 310. As the gaseous refrigerant exits the motor 302 via the outlet pipe 306, it is directed to the condenser 310 via the return pump 312a. The return pump 312a pumps the gaseous refrigerant to the condenser 310 via the outlet pipe 306.

Condenser 310 condenses the gaseous refrigerant and converts it to liquefied form in the same manner as described above with reference to condensers 110 and 210. The liquefied refrigerant then flows to a return pump 312b, which pumps the liquefied refrigerant, via the return pipe 313 towards the storage unit 322, for storage and reuse in powering the motor 302. The return pipe 313 is in fluid communication with the condenser 310 and the storage unit 322. Return pipe 313 includes an oil trap 317 for collecting oil removed by the liquefied refrigerant from the motor 302. The system 300 can include an apparatus for returning oil collected by the oil trap 317 back to the motor 302.

One or more components of the system 300 such as the metering device 305, the condenser 310, the heating element 318 and the return pumps 312a-b, can be powered using electrical, water, solar and/or wind power.

It will be understood that numerous modifications and changes in form and detail may be made to the embodiments of the present disclosure. Accordingly, the above description should not be construed as limiting the disclosed self-contained refrigerant powered systems but merely as exemplifications of the various embodiments thereof. Those skilled in the art will envision numerous modifications within the scope of the present disclosure as defined by the claims appended hereto.

What is claimed is:

1. A non-combusting refrigerant powered system comprising:
   a motor configured for receiving liquefied refrigerant stored in a storage unit, the motor comprising a heating element for heating the liquefied refrigerant without igniting the liquefied refrigerant and converting the liquefied refrigerant to gaseous form for powering the motor, wherein the heating element is inside the motor and is selected from the group consisting of a sparkplug, a transformer and an electrode;
   a condenser in fluid communication with the motor for receiving the gaseous refrigerant and for converting the gaseous refrigerant to liquefied form;
   a first pipe in fluid communication with the storage unit and the motor;
   a metering device in proximity to the first pipe for measuring at least one parameter of the liquefied refrigerant;
   a notification and correction system in operative communication with the metering device for monitoring said refrigerant powered system for any errors or irregularities that inhibit the proper flow of said liquefied refrigerant and for automatically correcting any error or irregularity;
   a plurality of sensors for obtaining data pertaining to said liquefied refrigerant and transmitting said data to said notification and correction system; and
   a second pipe in fluid communication with the motor and the condenser, wherein an opening of the second pipe providing fluid communication between the second pipe and the motor is unobstructed during operation of said refrigerant powered system;
   wherein the refrigerant powered system is self-contained.

2. The system as recited in claim 1, wherein the motor comprises a chamber in which said liquefied refrigerant enters and heated by said heating element.

3. The system as recited in claim 1, wherein the at least one parameter is selected from the group consisting of mass flow of the refrigerant, pressure of the refrigerant, temperature of the refrigerant, and volumetric flow of the refrigerant.

4. The system as recited in claim 1, further comprising a return pump in fluid communication with the motor, wherein the return pump receives the gaseous refrigerant from the motor and directs the gaseous refrigerant to the condenser via the second pipe.

5. The system as recited in claim 1, further comprising a return pump in fluid communication with the condenser, wherein the return pump receives the liquefied refrigerant from the condenser and directs the liquefied refrigerant to the motor via a return pipe.

6. The system as recited in claim 5, wherein the return pipe comprises an oil trap for collecting oil.

7. The system as recited in claim 6, further comprising an apparatus for returning oil collected by said oil trap to the motor.

8. The system as recited in claim 1, wherein said system is powered by wind power.

9. The system as recited in claim 1, wherein said system is powered by solar power.

10. The system as recited in claim 1, wherein said system is powered by water power.

11. The system as recited in claim 1, wherein the refrigerant is selected from the group consisting of freon, butane, helium and nitrogen.

12. The system as recited in claim 1, wherein the motor comprises a piston which is moved by the gaseous refrigerant.

13. A method for operating a non-combusting refrigerant powered system, the method comprising:
   introducing liquefied refrigerant inside a motor;
   heating the liquefied refrigerant while inside the motor without igniting the liquefied refrigerant and converting it to gaseous form using a heating element inside the motor and selected from the group consisting of a sparkplug, a transformer and an electrode;
   powering the motor using the gaseous refrigerant;

providing fluid communication between the motor and a condenser via a pipe having an opening which is unobstructed during operation of said refrigerant powered system;
converting the gaseous refrigerant to liquefied form by the condenser;
returning the liquefied refrigerant to the motor;
monitoring said system via said plurality of sensors for any error or irregularity that inhibit the proper flow of said liquefied refrigerant; and
automatically correcting the error or irregularity;
wherein the refrigerant powered system is self-contained.

14. The method as recited in claim 13, wherein liquefied refrigerant is selected from a group consisting of freon, butane, helium and nitrogen.

15. The method as recited in claim 13, wherein the motor comprises a piston which is moved by the gaseous refrigerant.

16. The method as recited in claim 13, wherein said system comprises a return pump which together with the condenser and a storage unit assists in alleviating pressure problems and backflow of the liquefied refrigerant that may arise during the operation of said refrigerant powered system.

17. The method as recited in claim 13, wherein the refrigerant powered system is powered by solar power.

18. The method as recited in claim 13, wherein the refrigerant powered system is powered by wind power.

19. The method as recited in claim 13, wherein the refrigerant powered system is powered by water power.

* * * * *